United States Patent
Zweifel

(10) Patent No.: US 7,451,440 B2
(45) Date of Patent: Nov. 11, 2008

(54) PATCH APPLICATION THAT ENABLES THE IDENTIFICATION OF PATCHES FOR INSTALLATION ON A COMPUTER SYSTEM IN A REACTIVE MANNER

(75) Inventor: Evan R. Zweifel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 10/755,113

(22) Filed: Jan. 9, 2004

(65) Prior Publication Data

US 2005/0188259 A1 Aug. 25, 2005

(51) Int. Cl.
G06F 9/44 (2006.01)
G06F 9/445 (2006.01)

(52) U.S. Cl. ............... 717/168; 717/169; 717/170; 717/171; 717/174; 717/175; 717/176

(58) Field of Classification Search ......... 717/168–171, 717/174–176
See application file for complete search history.

(56) References Cited

U.S. PATENT DOCUMENTS

| | | | | |
|---|---|---|---|---|
| 5,619,698 A | * | 4/1997 | Lillich et al. ............... | 717/168 |
| 6,052,531 A | * | 4/2000 | Waldin et al. ............... | 717/170 |
| 6,161,218 A | * | 12/2000 | Taylor ........................ | 717/168 |
| 6,230,316 B1 | * | 5/2001 | Nachenberg ................ | 717/169 |
| 6,363,524 B1 | * | 3/2002 | Loy ............................ | 717/170 |
| 6,477,703 B1 | * | 11/2002 | Smith et al. ................. | 717/168 |
| 6,611,812 B2 | * | 8/2003 | Hurtado et al. .............. | 705/26 |
| 6,763,517 B2 | * | 7/2004 | Hines .......................... | 717/168 |
| 6,950,847 B2 | * | 9/2005 | Harrisville-Wolff et al. . | 709/201 |
| 2003/0225866 A1 | * | 12/2003 | Hudson ....................... | 709/221 |
| 2004/0015938 A1 | * | 1/2004 | Taylor ........................ | 717/168 |
| 2004/0230828 A1 | * | 11/2004 | DeFuria et al. ............. | 713/200 |

* cited by examiner

Primary Examiner—Wei Y Zhen
Assistant Examiner—Qamrun Nahar

(57) ABSTRACT

A system and/or method selects program patches for installation into computer systems, where the patches are organized into patch chains each having a root. The method includes obtaining a base context identifier, searching for a patch in a context corresponding to the base context identifier, obtaining a system description, corresponding to a system where the system description includes more than hardware version and operating system version information, and filtering patches found in the search to remove patches not applicable to the system.

19 Claims, 7 Drawing Sheets

PATCH APPLICATION THAT ENABLES THE IDENTIFICATION OF PATCHES FOR INSTALLATION ON A COMPUTER SYSTEM IN A REACTIVE MANNER

CROSS REFERENCE TO RELATED APPLICATION

Not applicable.

BACKGROUND OF THE INVENTION

1. Field of the Invention

The present invention relates generally to techniques for maintaining programming systems, and more particularly, to methods for selecting which sets of program corrections or "patches" are identified for installation in a reactive manner.

2. Description of the Related Art

When an operating system, such as Hewlett-Packard's version of UNIX "HP-UX," receives new program files that are to be added to a given system, the files are delivered gathered into filesets having names, such as FS1, FS2, and so on. These filesets are installed on a given system by a process that unpacks and, possibly, uncompresses the files and places them onto the hard disk drive of that system. As in shown in FIG. 1, each fileset can contain a small or large number of files. The FILESET FS1 is shown containing the files FILE A, FILE B, ... and FILE F. Likewise, the FILESET FS2 is shown containing the files FILE J, FILE K, ... and FILE P. Of course, a fileset typically contains many more files than this. Some of these files would be program files, some would be data files, some would be graphic image and multimedia files, depending upon the particular nature of the system and the particular nature of the programming system being installed.

Patches, or corrected/updated sets of files, are also delivered to a system as collections of filesets. In the HP-UX system, it is customary that the filesets in a patch have the same names as the installed filesets. A patch fileset contains updated versions of some (possibly all) of the files in the system fileset having the same name. A given patch PATCH_5 contains new features and fixes or repairs for specific defects. Descriptions of the new features and of the repaired defects are contained in a text file that is maintained in a central database for each patch and that is searchable for words and phrases. FIG. 2 illustrates an example patches database. Accordingly, a systems administrator may search through the patch text file database and locate patches that repair particular defects or add particular features.

Over time, a first patch may be replaced by a second patch which contains all the fixes and new features of the first patch plus additional changes. These additional changes are called incremental fixes. The new patch then SUPERSEDES the previous patch. With reference to FIG. 4, the PATCH_4 at the root of the patch tree 40 supersedes all of the three patches to the left in this simple linear search tree. Historically, the first patch created was patch_1. It was superseded by PATCH_2, which was later superseded by PATCH_3, and that patch was later superseded by PATCH_4 which now resides at the root of the patch tree 40. Typically, large systems will contain large numbers of filesets, and these will be updated by the patches in multiple disjoint patch trees (i.e. a patch will appear in at most one tree). Accordingly, FIG. 6 illustrates a possible set of four patch trees 62, 64, 66, and 68 all comprising a set of patches 60 that are used to update a given system. The set of patch trees shown in FIG. 6 is selected by first determining what filesets a given system contains and by then, with reference to a patch tree database such as that shown at 30 in FIG. 3, selecting the root patches for all the patch trees that contain filesets having the same names as the system filesets. (See also FIGS. 4 and 12 and the accompanying text in U.S. Pat. No. 7,020,875.)

In some situations, as illustrated in FIG. 3 at 30 and also in FIG. 5 at 50, two or more patches will be replaced by a single patch. Thus, PATCH_6 SUPERSEDES both the patches PATCH_5 and PATCH_8. This is represented in the search tree by PATCH_6 forming the root of a sub-tree having the two branches PATCH_5 and PATCH_8. Referring now to FIG. 5, the same patch tree shown in FIG. 3 is shown at a later point in time. At some point in time, a new patch PATCH_9 was added which was not part of the original patch search tree but which initially formed a single isolated patch search tree having only one patch element. Then a new patch PATCH_7 was created which combined all of the updates and changes contained in the patches 5, 6, 8, and 9. Even later on, PATCH_7 was superceded by a new patch PATCH_10, thus forming the patch tree 50 shown in FIG. 5. The root patch in the patch tree 50 is the PATCH_10. That patch and PATCH_7 form the trunk of this searchable patch tree, which then branches into two branches, one containing PATCH_9 and another containing PATCH_6; and the PATCH_6 branch of the tree then branches again into the two patches PATCH_5 and PATCH_8. As can be seen, a patch tree can become quite elaborate over time as many patches are combined into a smaller number of newer patches. When placed into a patch tree database, as shown in FIG. 2, a patch tree can be searched in an automated manner.

Patch applications are designed to identify, analyze, and deliver patches to customers. A patch is applicable to a system if at least one of the filesets contained in the patch has already been installed on the system and no successor to the patch is already installed on the system. During the identification phase, algorithms identify starting locations on patch chains and traverse the chains, analyzing the attributes of the patches attempting to identify the most appropriate patch for the customer.

Known reactive patch applications have utilized knowledge about given computer systems. In patch terminology, reactive refers to searching for a patch to fix a particular problem. However, such applications have only used information regarding the hardware (HW) version and the operation system (OS) version of the computer system. As such, the patch application is forced to assume all patches for the specified hardware version and operating system version are applicable. The patch application is unable to eliminate many non-applicable patches from the search space. Indeed, when searching for patches using the patch application and specifying only the HW and OS, the resulting list of patches may be very large and may contain many patches which are not applicable. Moreover, when performing dependency analysis for patches given only the HW and OS, the patch application must assume that none of the dependents are installed on the computer system. The term "dependent" patches refers to a patch that requires the additional installation of a different patch found on a separate patch tree. A later patch includes a dependent patch within it. As a result, some dependent patches included are unnecessary because they (or one of their successors) are already installed on the customer's system

SUMMARY OF THE INVENTION

Briefly summarized, an embodiment of the invention may be found in a system and/or method which selects program patches for installation into computer systems, where the patches are organized into patch chains each having a root. The method includes obtaining a base context identifier, searching for a patch in a context corresponding to the base context identifier, obtaining a system description, corresponding to a system where the system description includes more than hardware version and operating system version information, and filtering patches found in the search to remove patches not applicable to the system.

DETAILED DESCRIPTION

Figure 1:
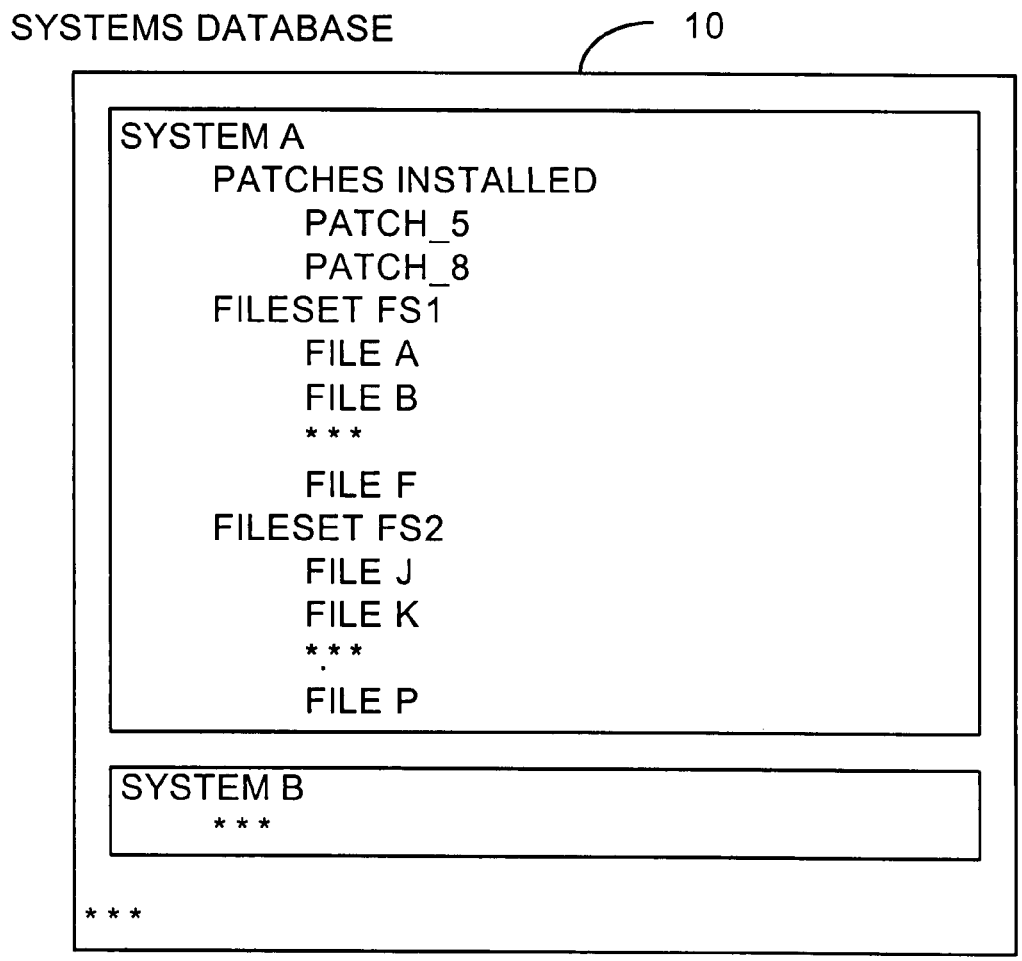
FIG. 1 presents the structure of a prior art systems database that indicates which files, which filesets, and which patches are installed on each system.
Figure 2:
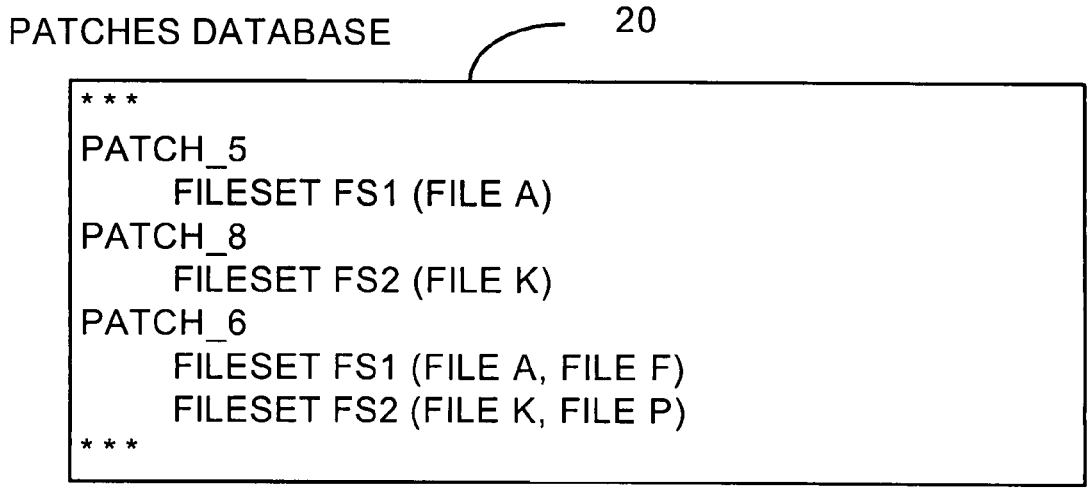
FIG. 2 presents the structure of a prior art patches database that indicates what filesets each patch corrects and which files within those filesets the patches repair or modify or both.
Figure 3:
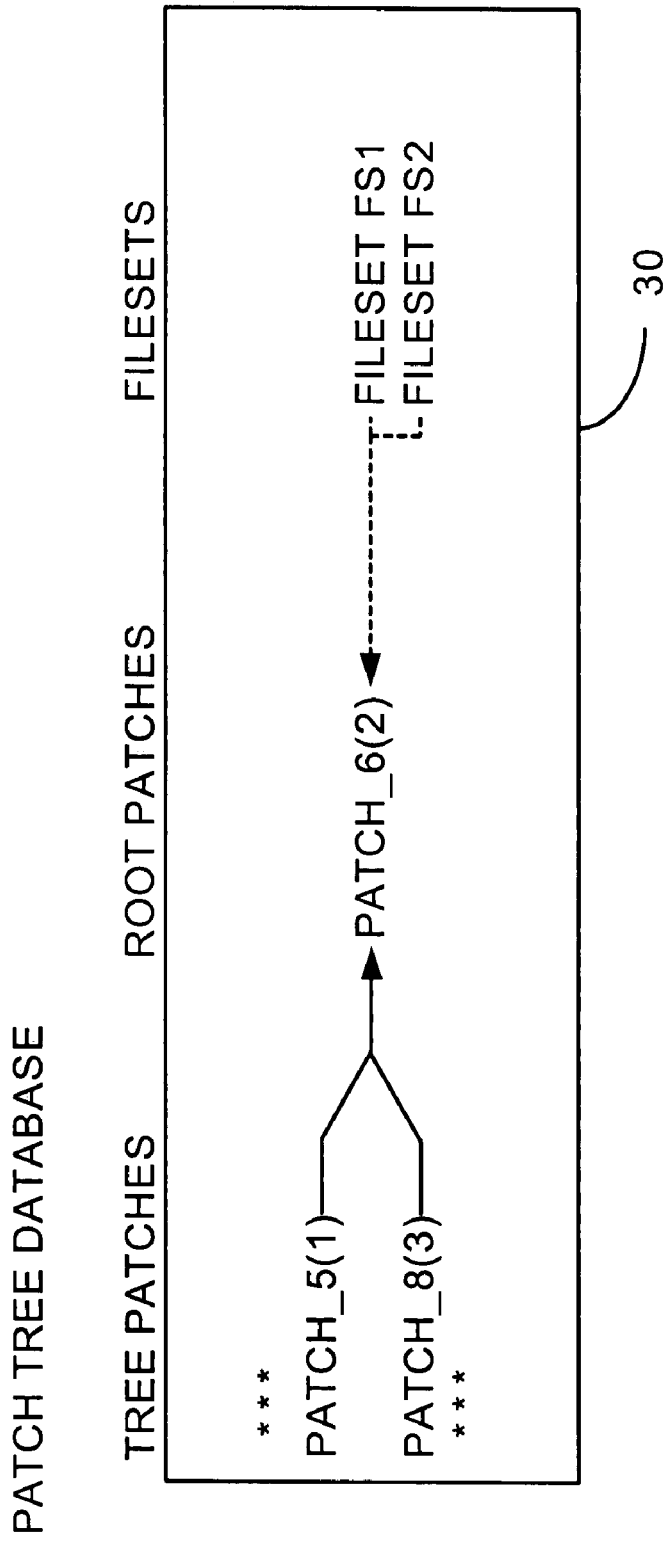
FIG. 3 presents the prior art database structure of a patch tree database showing the root patch for each patch tree, the filesets that each patch tree modifies, and the non-root patches within the branches of each patch tree.
Figure 4:
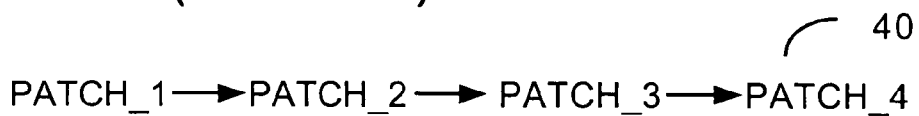
FIG. 4 presents a simple prior art linear patch tree.
Figure 5:
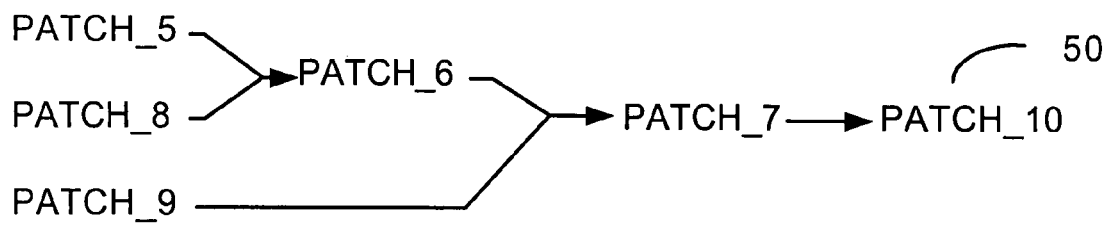
FIG. 5 presents a more complex prior art patch tree with several branches.
Figure 6:
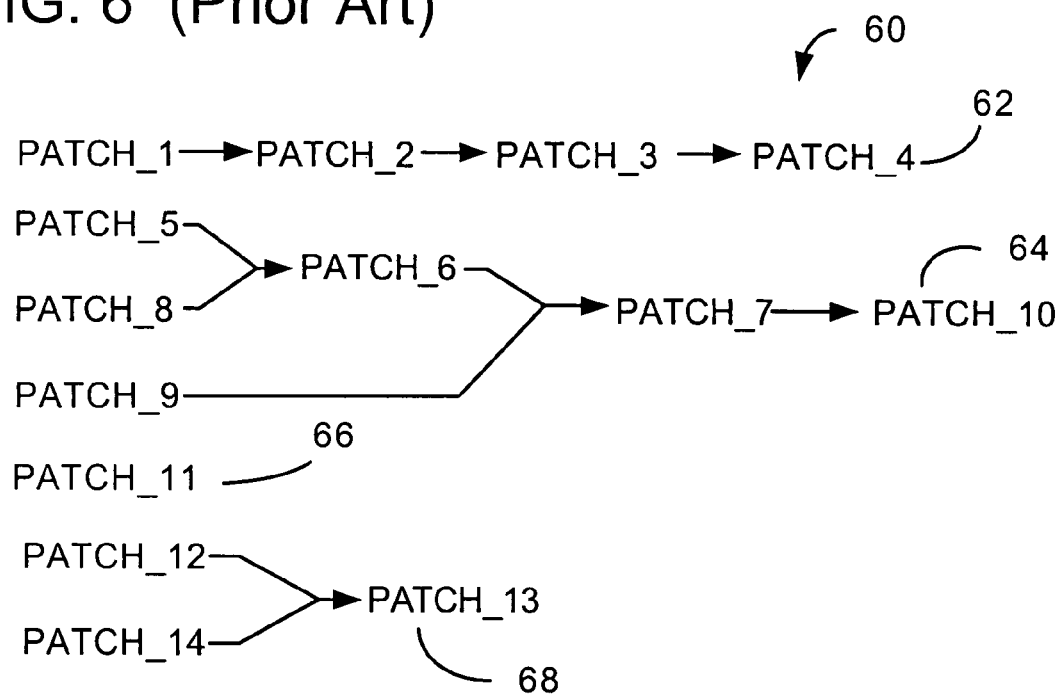
FIG. 6 presents a prior art set of four patch trees, two of which have branches.
Figure 7:
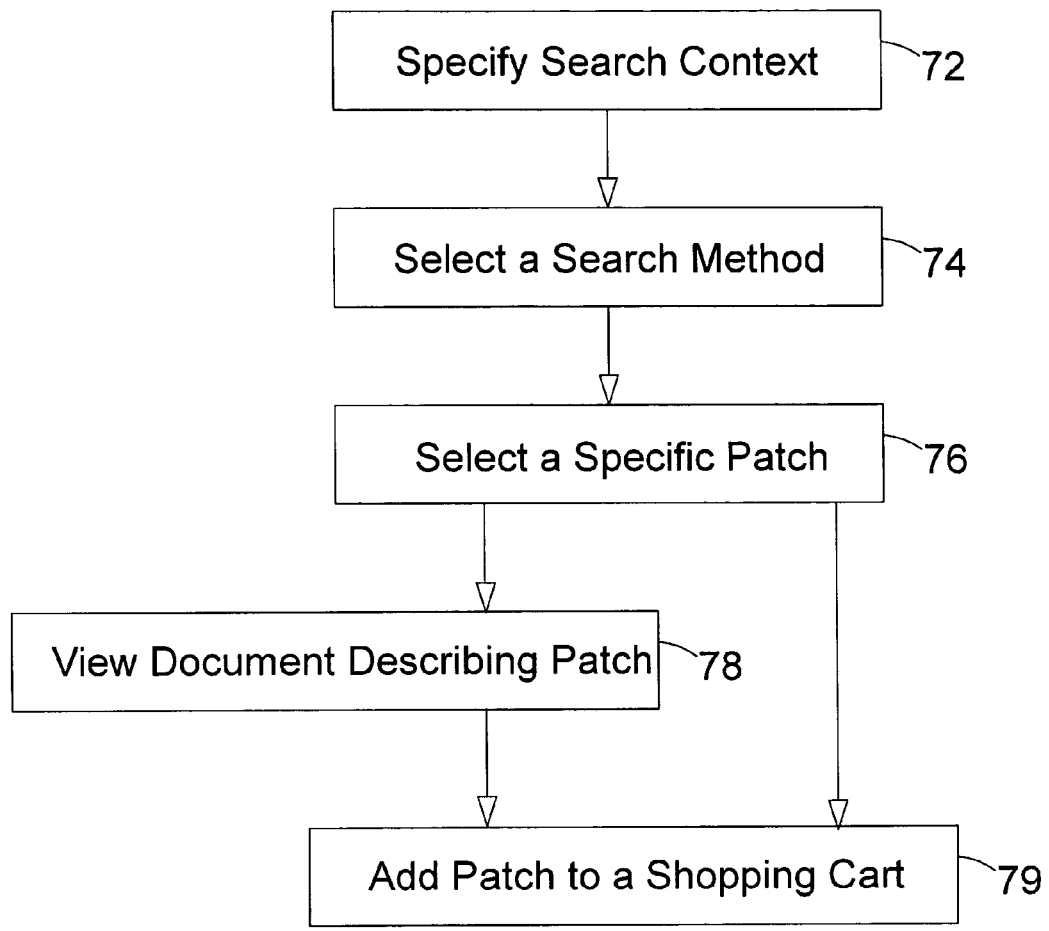
FIG. 7 presents a flow diagram depicting exemplary operations for obtaining software patches in accordance with an embodiment of the invention.

FIG. 7 illustrates exemplary operations performed in a primary use model for obtaining software patches. Additional, fewer, or different operations may be performed in various processes for obtaining software patches, depending on the embodiment. In an exemplary embodiment, the primary use model is search centric and uses a shopping cart model. In an operation 72, a user specifies a search context, such as the hardware and operating system that the user has. In an operation 74, the user selects a search method for finding patches. The search method can be searching by a patch ID (identifier), searching by keyword, or searching by browsing in the specific context, for example. A patch application presents a list of patches matching the search criteria. In an operation 76, the user can select a specific patch for installation and correction of a problem on a computer system and, in an operation 78, the user can view a document describing details of the patch.

Figure 8:
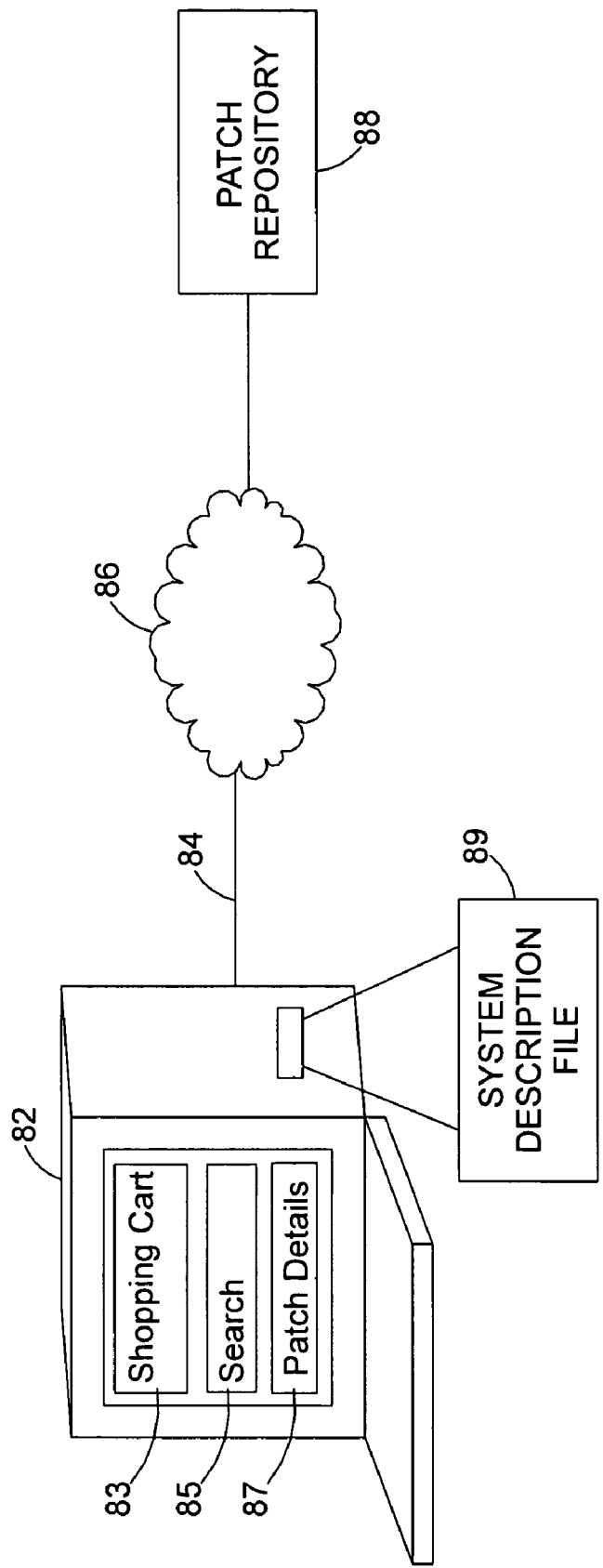
FIG. 8 presents an overview diagram of a patch application system including a computer system having a system description file and user interface displays for patch searches, patch details, and a shopping cart in accordance with an embodiment of the invention.

In an operation 79, either from a search results page, or from a patch details page, the user can add a patch to a shopping cart. The search results page, patch details page, and shopping cart are depicted in FIG. 8. Each page can include a user interface that presents information to the user. From the shopping cart page, the user may take delivery of the patches by downloading the binary files individually or en masse (in a variety of different formats). Although a wide range of purchasing models can be employed in different embodiments, the shopping cart model has the advantage of being able to enforce certain patching rules. Example rules can include a rule that two patches on the same patch chain cannot be installed on a computer system, therefore cannot both appear in the cart. Another rule can be that if a patch requires other patches (dependencies), the dependent patches must also appear in the shopping cart.

The search page, the patch details page, and the shopping cart (FIG. 8) behave differently depending on context. For example, in the search page, the context controls which patches are searched. In the patch details page, the context controls which related patches are displayed (the recommended and/or successors). In the shopping cart, the context controls which dependent patches are included in the cart for the user to download.

The context parameter for the search page, patch details page, and shopping cart can be specified as a string of the form "HW:OS" which is used as a key to locate information which is used to control the behavior of these pages. This string is referred to as the ContextID. Pages and requests that need to know the current context can be passed the ContextID as a request parameter.

FIG. 8 illustrates a system 82 having a connection 84 to a network 86 that is in communication with a patch repository 88. The user communicates information about the system 82 to be patched by uploading a system description file 89. The file 89 can be created by executing a collector script. The collector script may be obtained in a variety of ways, such as downloading it from the patch repository 88. The system description file 89 contains a list of attributes describing the system including, for example, the hardware and operating system revisions, a list of the filesets installed, and a list of the patches installed.

The system 82 presents the user with user interface pages, including, for example, a search page 85, a patch details page 87, and a shopping cart 83. Additional interfaces may also be included. The search page 85 presents an interface where the user can search for patches and review the found patches. The patch details page 87 presents an interface providing recommended and/or successor patches and information about the patches. The shopping cart 83 presents an interface where the user can see selected patches to be obtained and/or purchased. Some patches may require purchase, whereas some patches may not. Use of the term "shopping cart" refers to a model for selecting and obtaining patches. Purchase by whatever means may or may not be a part of the shopping cart.

In an exemplary embodiment, the system description file 89 can be stored in a database accessible by the patch repository 88. A patch application can use the system description file 89 to provide patches that are available for use with the system 82. The system description file 89 may contain a string that identifies the system 82. This string may contain two components, a uniform resource identifier (URI) and a resource base context ID. The URI is a key which can be passed to a ResourceLocator object within the patch application resulting in the extraction of the system description file 89 from the database.

The resource base context ID is the normal ContextID describing the hardware and operating system of the system described by the system description file 89 as well as installed programs and patches. The new string is referred to as a ResourceContextID. The string can take the form of: "URI{BaseContextID}". Pages expecting a ContextID parameter can be generalized to allow the passing of a ResourceContextID.

Figure 9:
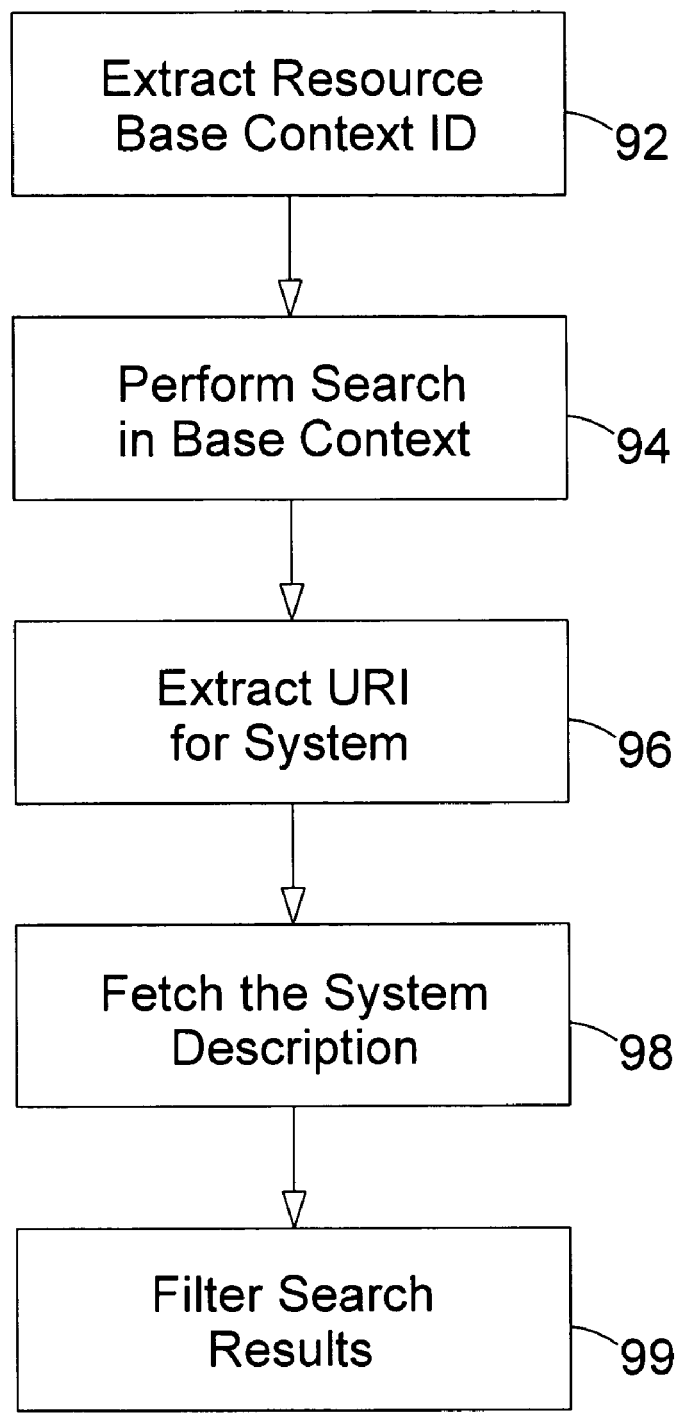
FIG. 9 presents a flow diagram depicting exemplary operations for patch searching in accordance with an embodiment of the invention.

FIG. 9 illustrates exemplary operations performed in patch searching process. Additional, fewer, or different operations may be performed in various patch searching processes, depending on the embodiment. In an operation 92, a resource base context ID is extracted from the ResourceContextID. As explained above, the ResourceContextID may be located in a string contained in the system description file. In an operation 94, a search is performed in the corresponding base context. In an operation 96, the URI is extracted for the system specified in the ResourceContextID. In an operation 98, the system description is obtained using the ResourceLocator and the URI. The search results are filtered in an operation 99, removing any patches which are not applicable to the system. The search results are presented to the user, allowing the user to browse to the specifics of a patch or to add patches to the shopping cart.

The existing patch details display page receives a contextID to enable the computation of related patches (the recommended successor and the latest patch of the chain). The ContextID may be passed along from the patch details page when adding a patch to the shopping cart. As discussed, the ContextID may be a ResourceContextID. In this case, the computation of the related patches uses the corresponding base context stored in the ResourceContextID. If the ContextID is a ResourceContextID, then the base context ID is extracted from the ResourceContextID. The recommended and latest patches can be located using this base context ID.

In an exemplary embodiment, the shopping cart is partitioned into sections based on the ContextID. When adding a patch to the cart, the appropriate ContextID must be provided. The patch is added to the appropriate section and the dependencies for that section are re-computed and added to that section. Each section is preferably comprised of two parts: the patches which the user explicitly requested, and the patches which are included as dependencies of explicitly requested patches. This partitioning is generalized to allow sections in the shopping cart corresponding to ResourceContextIDs (and thus patches for a particular system). Also, the processing of dependencies is generalized to minimize the number of patches in the cart, by using the knowledge of the system being manipulated.

Figure 10:
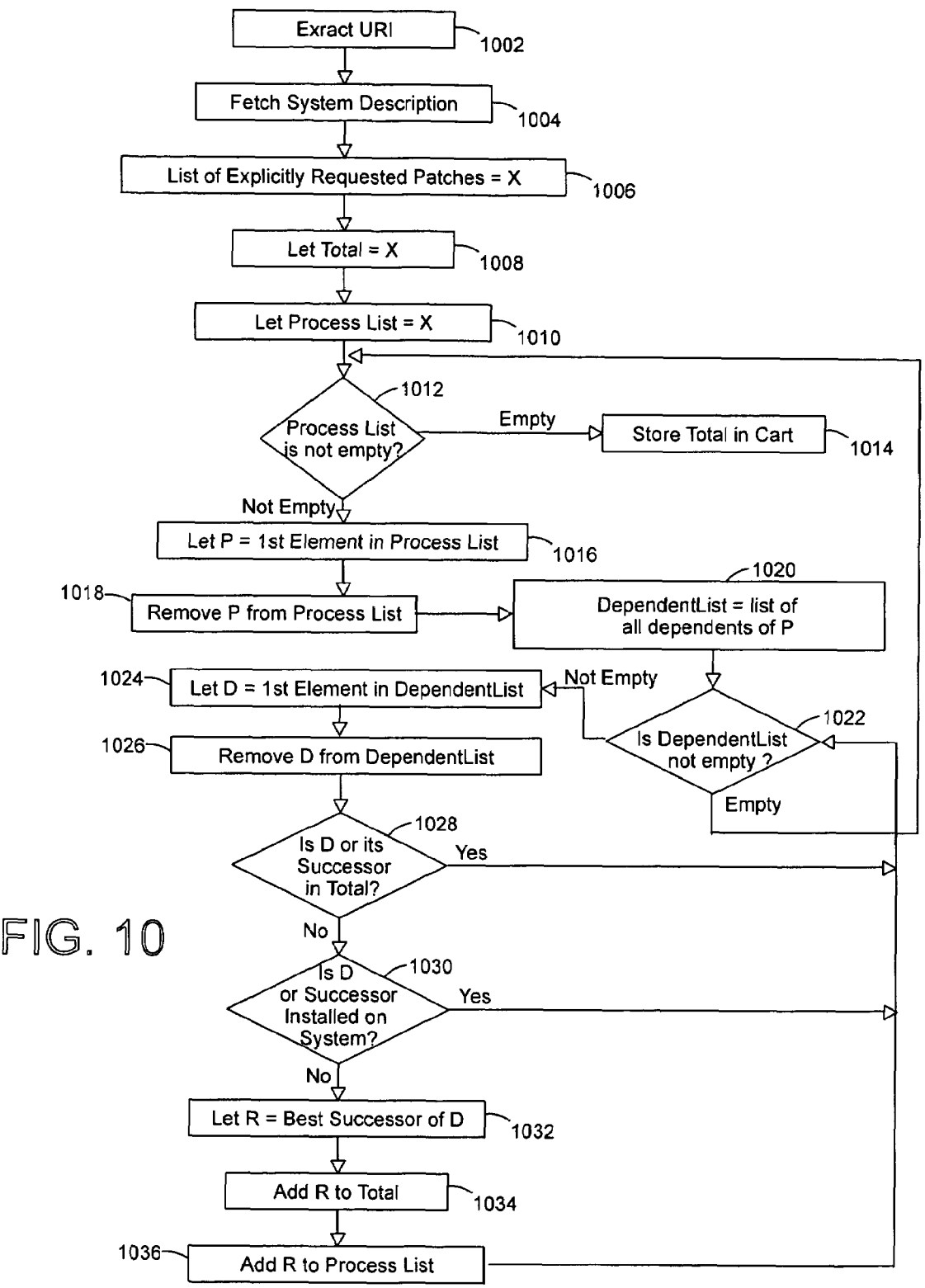
FIG. 10 presents a flow diagram depicting exemplary operations for patch searching in accordance with another embodiment of the invention.

FIG. 10 illustrates exemplary operations performed in a patch processing process. Additional, fewer, or different operations may be performed in various patch processing processes, depending on the embodiment.

In an operation 1002, the URI is extracted for the system specified in the ResourceContextID. In an operation 1004, the system description is obtained using the ResourceLocator and the URI. In an operation 1006, the list of the explicitly requested patches for the section corresponding to the ResourceContextID is set to a variable "X." In operations 1008 and 1010, the variables Total and ProcessList are both set to X. In an operation 1012, ProcessList is checked to see if it is empty. If it is empty, Total is stored in the shopping cart in an operation 1014. If it is not empty, an operation 1016 is performed in which the first element in ProcessList is set to a variable "P".

After operation 1016, an operation 1018 is performed in which P is removed from the ProcessList. In an operation 1020, the variable DependentList is set to a list of all of the dependents of P. In an operation 1022, the DependentList is checked to see if it is not empty. If DependentList is empty, the procedure goes to operation 1012. If DependentList is not empty, an operation 1024 is performed in which the variable D is set to the first element in the DependentList. Then, in an operation 1026, D is removed from the DependentList. In an operation 1028, a check is made as to whether, D or its successor is in Total. If D or its successor is in Total, control passes to operation 1022. If D is not in Total, an operation 1030 is performed in which a check is made as to whether D or its successor is installed on the system. If D or its successor is installed on the system, control returns to operation 1022. If D or its successor is not installed on the system, an operation 1032 is performed in which R is set to the best successor of D. In an operation 1034, R is added to Total and, in an operation 1036, R is added to Process List. After operation 1036, control returns to operation 1022.

Advantageously, generalizing ContextID to ResourceContextID, allowing the inclusion of a key to specify a system to be patched, and making modifications to a few pages provides for improved patching models for computer systems.

While several embodiments of the invention have been described, it is to be understood that modifications and changes will occur to those skilled in the art to which the invention pertains. Accordingly, the claims appended to this specification are intended to define the invention precisely.

The invention claimed is:

1. An automated, computer-implemented method of assisting a user in searching through and selecting program patches for installation on a given computer system, where the patches are organized into patch chains stored in a patch chain memory, where the names of files or programs to which the patches are applicable are stored in a patch chain file memory, and where the dependencies of some patches upon prior installation of other patches are stored in a dependencies memory, the method comprising the steps of:

obtaining from the given system and supplying to a system description memory a system description comprising hardware version and operating system version information and also information identifying at least some installed files or programs and also some installed patches, if any;

guiding the user through the process of searching through a patch database for one or more patches, and for the purpose of finding one or more relevant patches and placing identifiers of these patches into a relevant patch memory, with the scope of the search automatically limited to patches consistent with the information for the given computer system included in the system description memory and thus relevant to patching the given computer system;

with respect to any relevant patches found through searching and any additional recommended patches, examining each of the relevant and recommended patches in the context of additional patches, if any, residing in the same patch chain to assist the user in selecting between patches found or recommended and any preferred patches or successor patches residing in the same patch chains; and when the user selects one or more patches for installation, adding to the patches selected any additional patches upon which the selected patches are dependent.

2. The method of claim 1, wherein, in the step of guiding the user through the process of searching through a patch database, further limiting the scope of the search for patches, at the option of the user, by means of words, numbers, or phrases descriptive of patches and their purposes.

3. The method of claim 1, further including the step of filtering the patches found in the search or otherwise found to insure that no more than one patch from a given patch chain is selected.

4. The method of claim 1, wherein, with respect to any patches found through searching and any additional recommended patches, and with reference to the patch chains of these found or recommended patches, assisting the user in selecting successors in the patch chain, if any, to already installed patches.

5. The method of claim 4, which includes the step of checking the system description to determine if a patch or its successors are already installed on the system.

6. The method of claim 1 which further includes the additional step of conveying selected patches into an electronically generated and displayed shopping cart in response to the user selecting one or more patches for installation.

7. A set of computer programs most of which are installable in a memory of, and executable by a processor of, a patch selection computer, the computer and the set of programs forming a patch selection system for aiding a user in the selection of program patches for installation on a given computer system, where the patches are organized into patch chains stored in a patch chain memory, where the names of files or programs to which the patches are applicable are stored in a patch chain file memory, and where the dependencies of some patches upon the prior installation of other patches are stored in a dependencies memory, these memories being connected to and accessible by the patch selection computer, the system comprising:

- a system identification mechanism comprising a program installable in the memory of, and executable by the processor of, the given computer which, when run, obtains from the given computer system and supplies to a system description memory connected to and accessible by the patch selection computer a system description comprising hardware version and operating system version information and also information identifying at least some installed files or programs and also some installed patches, if any;
- a patch search mechanism comprising a computer program which enables the user to search for and find one or more relevant patches and to place identifiers of these patches into a relevant patch memory connected to and accessible by the patch selection computer, with the scope of the search automatically limited to patches consistent with the information for the given computer included in the system description memory and thus relevant to patching the given computer;
- with respect to any relevant patches found by the patch search mechanism and any additional recommended patches, a patch chain examination mechanism comprising a computer program which examines each of the relevant and recommended patches in the context of additional patches, if any, residing in the same patch chain, the patch chain examination mechanism assisting the user in selecting between patches found or recommended and any preferred patches or successor patches residing in the same patch chains; and
- a patch selection mechanism comprising a computer program which facilitates the user in selecting one or more patches for installation, said selection mechanism also adding to the selected patches any additional patches upon which the selected patches are dependent.

8. The system of claim 7, wherein the patch chain examination mechanism also suggests the selection of patch chain successors, if any, to patches that are already installed on the given system.

9. The system of claim 7, wherein the patch chain examination mechanism also filters the patches to insure that no more than one patch from a given patch chain is selected by the user.

10. The system of claim 7, wherein the patch search mechanism, which enables a user to search for and find one or more patches, permits the user to further narrow the scope of any search using, words, numbers, or phrases descriptive of patches and their purpose.

11. The system of claim 7, further comprising a communication interface providing visual and tactile communication between the user and the selection system, the communication interface including visual information defining a search page used to aid the user in searching for patches, a patch details page used to aid the user in examining patches in the context of their patch chains and to consider selecting preferred or successor patches, and a shopping cart to contain finally selected patches and patches they may be dependent upon.

12. The system of claim 7, further comprising a patch download mechanism which communicates selected patches to the given computer system.

13. The system of claim 12, wherein selected patches are displayed to the user in an electronically generated and displayed shopping cart.

14. A set of computer programs most of which are installable in a memory of and executable by a processor of a patch selection computer, the computer and the set of programs forming a program patch system for assisting a user in the selection of program patches for installation on a given computer system, where the patches are organized into patch chains stored in a patch chain memory, where the names of files or programs to which the patches are applicable are stored in a patch chain file memory, and where the dependencies of some patches upon the prior installation of other patches are stored in a dependencies memory, these memories being connected to and accessible by the patch selection computer, the system comprising:

- means for obtaining from the given computer system and supplying to a system description memory connected to and accessible by the patch selection computer a system description comprising hardware version and operating system version information and also information identifying at least some installed files or programs and also some installed patches, if any;
- means for guiding the user through the process of searching through a patch database for one or more patches, and finding one or more relevant patches and placing identifiers of these patches into a relevant patch memory connected to and accessible by the patch selection computer, with the scope of the search automatically limited to patches consistent with the information for the given computer included in the system description memory and thus relevant to patching the given computer;
- with respect to any relevant patches found though searching and any additional recommended patches, means for examining each of the relevant and recommended patches in the context of additional patches, if any, residing in the same patch chain, and for assisting the user in selecting between patches found or recommended and any preferred patches or successor patches residing in the same patch chains; and
- when the user selects one or more patches for installation, means for adding to the patches selected any additional patches upon which the selected patches are dependent.

15. The system of claim 14, wherein the scope of the search for patches performed by the means for guiding the user through the process of searching through a patch database is further limited, at the option of the user, by means of words, numbers, or phrases descriptive of the patches and their purposes.

16. The system of claim 14 which further comprises means for filtering the patches found in the search or otherwise found to insure that no more than one patch from a given patch chain is selected.

17. The system of claim 14 which further includes, with respect to any patches found though searching and any additional recommended patches, and with reference to the patch chains of these found or recommended patches, means for assisting the user in selecting successors in the same patch chain, if any, to already installed patches.

18. The system of claim 17, wherein the means for filtering patches includes means for checking the system description to determine if a dependent patch or its successors are already installed on the system.

19. The system of claim 14, further comprising means for placing user selected patches into a computer-implemented visual shopping cart.

* * * * *

UNITED STATES PATENT AND TRADEMARK OFFICE
CERTIFICATE OF CORRECTION

PATENT NO. : 7,451,440 B2
APPLICATION NO. : 10/755113
DATED : November 11, 2008
INVENTOR(S) : Evan R. Zweifel Page 1 of 1

It is certified that error appears in the above-identified patent and that said Letters Patent is hereby corrected as shown below:

In column 8, line 22, in Claim 14, after "memory of" insert -- , --.

In column 8, line 22, in Claim 14, after "processor of" insert -- , --.

In column 8, line 51, in Claim 14, delete "though" and insert -- through --, therefor.

In column 9, line 6, in Claim 17, delete "though" and insert -- through --, therefor.

Signed and Sealed this

Fourteenth Day of April, 2009

JOHN DOLL
*Acting Director of the United States Patent and Trademark Office*